United States Patent [19]
Jung

[11] Patent Number: 5,852,523
[45] Date of Patent: Dec. 22, 1998

[54] DATA SECTOR PULSE GENERATING METHOD

[75] Inventor: Kwang-Jo Jung, Suwon, Rep. of Korea

[73] Assignee: Samsung Electronics Co., Ltd., Suwon, Rep. of Korea

[21] Appl. No.: 659,737

[22] Filed: Jun. 6, 1996

[51] Int. Cl.⁶ .............................. G11B 5/09; G11B 5/596
[52] U.S. Cl. .................... 360/49; 360/77.08; 360/78.14
[58] Field of Search .................... 360/49, 77.07, 360/77.08, 77.11, 78.04, 78.14

[56] References Cited

U.S. PATENT DOCUMENTS

| | | | |
|---|---|---|---|
| 5,313,340 | 5/1994 | Takayama et al. | 360/51 |
| 5,506,735 | 4/1996 | Okazaki et al. | 360/77.08 |
| 5,539,795 | 7/1996 | Takase | 360/51 |
| 5,627,695 | 5/1997 | Prins et al. | 360/77.08 |
| 5,650,882 | 7/1997 | Tsurumi et al. | 360/78.14 |

*Primary Examiner*—Aristotelis M. Psitos
*Assistant Examiner*—Regina Y. Neal
*Attorney, Agent, or Firm*—Jones & Volentine, L.L.P.

[57] ABSTRACT

A method of generating data sector pulse in a magnetic disk drive includes the steps of servo-writing a bit of index pattern information corresponding to each servo sector in an index area of a servo area on the magnetic disk by a predetermined rule, mapping a data sector pulse timing value with respect to a representative frame of each zone in an inside storage by changing the frame number of relevant zone according to the characteristic of each zone, and reading a sector pulse timing value with respect to a predetermined sector of a predetermined track from the inside storage by deciphering the index pattern information read from the track according to the rule and loading the read result in a gate array for generating the data sector pulse.

8 Claims, 8 Drawing Sheets

DATA SECTOR PULSE GENERATING METHOD

CROSS REFERENCE TO RELATED APPLICATIONS

The subject matter of the present application is related to that in co-pending applications Ser. Nos. 08/653,968, entitled "Method for Detecting Data Stroke for Disk Drive", filed May 28, 1996; 08/656,878, entitled "System and Method for Controlling Spindle Motor for Hard Disk Drive Unit", filed May 30, 1996; 08/658,099, now U.S. Pat. No. 5,737,145, entitled "Method for Generating Index Pulse with Index Pattern", filed Jun. 4, 1996; 08/657,665, entitled "Servo Information Recording Method for a Magnetic Recording Medium", filed May 31, 1996; 08/661,492, entitled "Servo Sector Forming Method for Fast Detection and Track Address Correcting Method", filed Jun. 11, 1996; 08/676,962, entitled "Sealing Device of Hard Disk Drive"; and 08/661,491, entitled "Method for Determining a Position of Track-Zero and Mapping Tracks According Thereto, filed Jun. 11, 1996, incorporated herein by reference.

FIELD OF THE INVENTION

The present invention relates to a magnetic disk drive, and more particularly, to a method of generating data sector pulses.

BACKGROUND OF THE INVENTION

For high-density and high-capacity of a magnetic disk in a magnetic disk drive, zone bit recording technology has developed along with various methods for classifying data sectors. A common method for classifying the data sectors in a conventional technology uses a frame structure.

FIG. 1 is a diagram illustrating a frame structure of a magnetic disk according to a conventional technology. Referring to FIG. 1, the magnetic disk is structured by zones which are divided by a plurality of circumferential zone boundaries and by frames which are divided by a plurality of radial frame boundaries. In the frame structure as illustrated in FIG. 1, one frame is defined with a plurality of sectors in a single track.

The sector is classified into a servo sector and a data sector. Here, the servo sector is a sector which corresponds to a predetermined physical length in a servo write. Accordingly, during a servo write, a servo signal for informing the servo sector is recorded in a servo area. The data sector is a sector for putting a predetermined amount of data, (i.e., 512 bytes) in at least one data area. In the present specification, the concepts of the sector and the servo sector are regarded as the same or similar one, and will be used accordingly.

In a single track, each frame may have the same data sector structure. Thus, groups of the same data sector structure may repeatedly appear in one track as many times as there are frame numbers.

FIG. 2 is a diagram illustrating waveforms of an index pulse and a sub-index pulse for classifying each frame according to the frame structure shown in FIG. 1. To classify each frame, the first sector of the first frame is indicated by an index pulse (IDXP) and the first sector of the remaining frames is indicated by a sub-index pulse (SIDXP).

FIG. 3 is a diagram illustrating signal timing for classifying the servo sector and the data sector in a single frame. A servo pulse (SVO) for classifying the servo sectors may be generated in an area where the servo signal is servo-written on the magnetic disk. A data sector pulse (DSTP) for classifying the data sectors is generated in a data read/write area. In a zone bit recording method, since bit per inch (BPI) is almost uniformly maintained in every zone, the numbers of data sectors in each zone is different.

FIG. 3 is a diagram illustrating an example where one frame is divided into ten servo sectors and the disk is divided into four zones. In such an example, there are 20 data sectors in a zone 1; 14 data sectors in a zone 2; 10 data sectors in a zone 3; and 8 data sectors in a zone 4.

When the frame structure is employed, the structure of FIG. 3 repeats in each of the plurality of frames. In such a frame structure, the generation position of the data sector pulse with respect to one frame can be repeatedly used in the other frames. Thus, due to the frame structure, the memory size of a controller, (i.e. a central processing unit or CPU), of the magnetic disk drive can be reduced.

FIG. 4 is a diagram illustrating in detail a pattern of the servo area in a sector. The servo area pattern is comprised of a servo sync pattern, a servo address mark (SAM) pattern, an index servo header pattern and a burst pattern (A, B, C and D). The servo sync pattern which is the first portion of the servo area is for seeking a servo address mark. The SAM pattern recorded at the starting position of the servo area is an information area for informing a sync starting position of servo signal detection. The servo header is an information area for indicating the position of the track on the disk. The burst pattern is an information area for indicating a position of a head within a track.

In conventional technology, the index pulse and the sub-index pulse may be indicated using index pattern information illustrated in FIG. 4. There may be three types of information in the index pattern. To distinguish these types, the index pattern information should be structured with at least two bits, for example, as illustrated in Table 1.

TABLE 1

| Index Pattern | Information |
|---|---|
| 00 | N/A |
| 01 | Sub-Index Sector |
| 10 | Index Sector |
| 11 | General Sector |

Here, the index sector means the first sector of the first frame, and the sub-index sector means the first sector of the remaining frames. The general sector means the remaining sectors exclusive of the index sector and the sub-index sector. The index pattern information indicating the position of the index sector, sub-index sector or the general sector is already written during the servo write. Then, the index pattern information is decoded at a gate array of the magnetic disk drive, and the index pulse and the sub-index pulse are generated at the gate array itself. The index pulse and the sub-index pulse may then be applied to the CPU.

FIG. 5 is a block diagram illustrating how the data sector pulse may be generated using conventional technology. A servo signal including index pattern information (IDXPTN) read from a predetermined track on a magnetic disk by a head 10 is transmitted to a gate array 14 via a servo demodulator of a read/write channel circuit 12. Gate array 14 decodes IDXPTN from the servo signal and determines a type of a current sector (an index sector or a sub-index sector). Then, IDXP or SIDXP as shown in FIG. 2 is transmitted to a CPU 16. Also, gate array 14 applies to CPU 16 the SVO indicative of a servo signal section and a servo header indicative of a track position.

The zone of the current track is distinguished according to the servo header at CPU 16. The SVO is counted on the base of IDXP or SIDXP. A pulse timing value (TMG) of the data sector in accordance with SVO count is read from a table mapped in ROM 18 and loaded on gate array 14. Then, gate array 14 applies DSTP to a disk controller 20 according to TMG.

Here, timing values of a data sector pulse being tabled by a zone are stored in ROM 18. The size of the table is determined according to the numbers of the servo sectors and zones constituting one frame.

In the case where one frame is comprised of ten servo sectors and four zones as illustrated in FIG. 3, two DSTPs are generated for one servo sector in zone 1. Consequently, timing values of twenty DSTPs are necessary for one frame. For entire zones (zones 1 to 4), eighty (20×4) timing values are required. Each timing value is a timing value with respect to a position where DSTP should occur from a particular reference point of each servo sector.

As explained above, the problem of conventional technology is that the frame is fixed. That is, the number of the servo sectors of one frame in the all of the zones is constant. Accordingly, it is difficult to determine the length of the data sector in accordance with the zone. Also, it is another problem in the conventional technology that the data sector pulse with respect to one frame cannot be loaded when index pattern information of the index sector or the sub-index sector is missing due to operational failure of the head, or cannot be normally decoded due to failure of the disk.

SUMMARY OF THE INVENTION

To solve the above problems, it is an object of the present invention to provide a method for varying the frame size of a magnetic disk and generating the data sector pulse accordingly.

It is another object of the present invention to provide a method for generating the data sector pulse with less effects of physical defects produced by such as a recording medium or a head.

It is still another object of the present invention to provide a method for reducing inner memory capacity taken up to generate the data sector pulse.

It is still yet another object of the present invention to provide a method for calculating the sector number of a corresponding servo sector by sector count and generating the data sector pulse by using the calculation.

Accordingly, to achieve the above objects, there is provided a method for adjusting a frame size in accordance with each zone in software by counting a servo sector by a CPU unlike the data sector pulse generating method by the fixed frame structure according to the conventional technology. Thus, the number of data sectors are set appropriate to the characteristic of the zone. Also, unlike the conventional method in which the data sector pulse with respect to one frame is generated with the standard of the index sector or the sub-index sector based on a particular index pattern information to generate the data sector pulse of one track, a position of each servo sector is accurately confirmed by counting the sector number in one track in the present invention, thereby removing possibility of errors.

BRIEF DESCRIPTIONS OF THE DRAWINGS

DETAILED DESCRIPTION OF THE INVENTION

Figure 1:
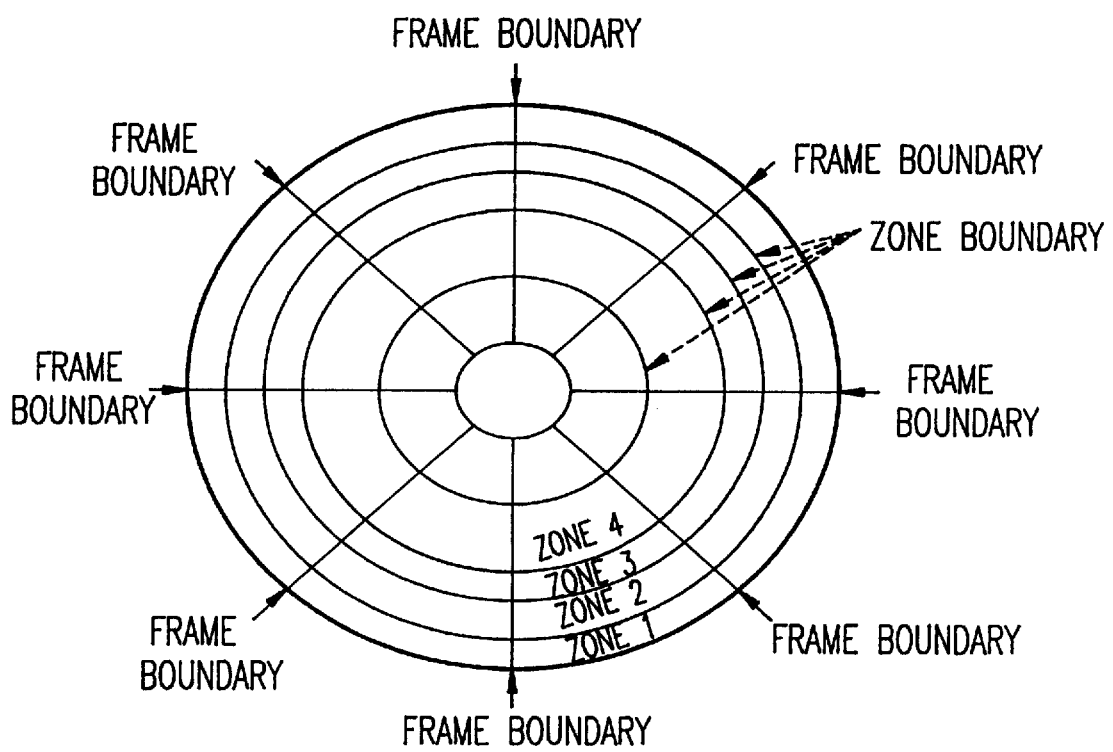
FIG. 1 is a diagram illustrating a frame structure of a magnetic disk according to a conventional technology.
Figure 2:
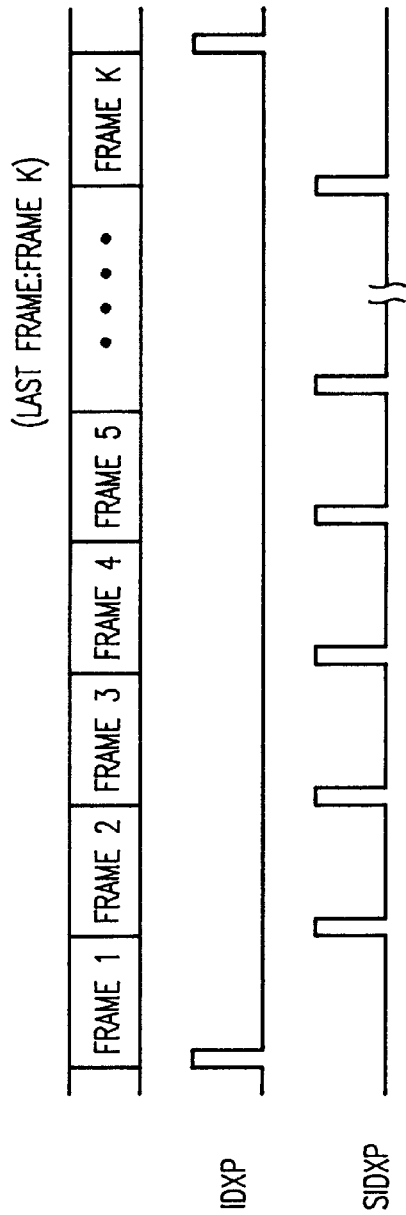
FIG. 2 is a diagram illustrating waveforms of an index pulse and a sub-index pulse for classifying each frame according to the frame structure shown in FIG. 1.
Figure 4:
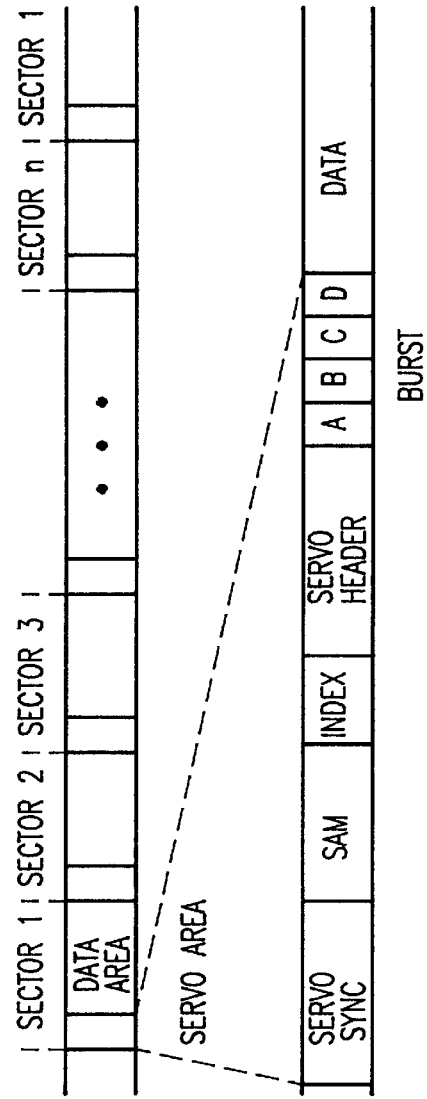
FIG. 4 is a diagram illustrating in detail a pattern of the servo area in the sector.
Figure 3:
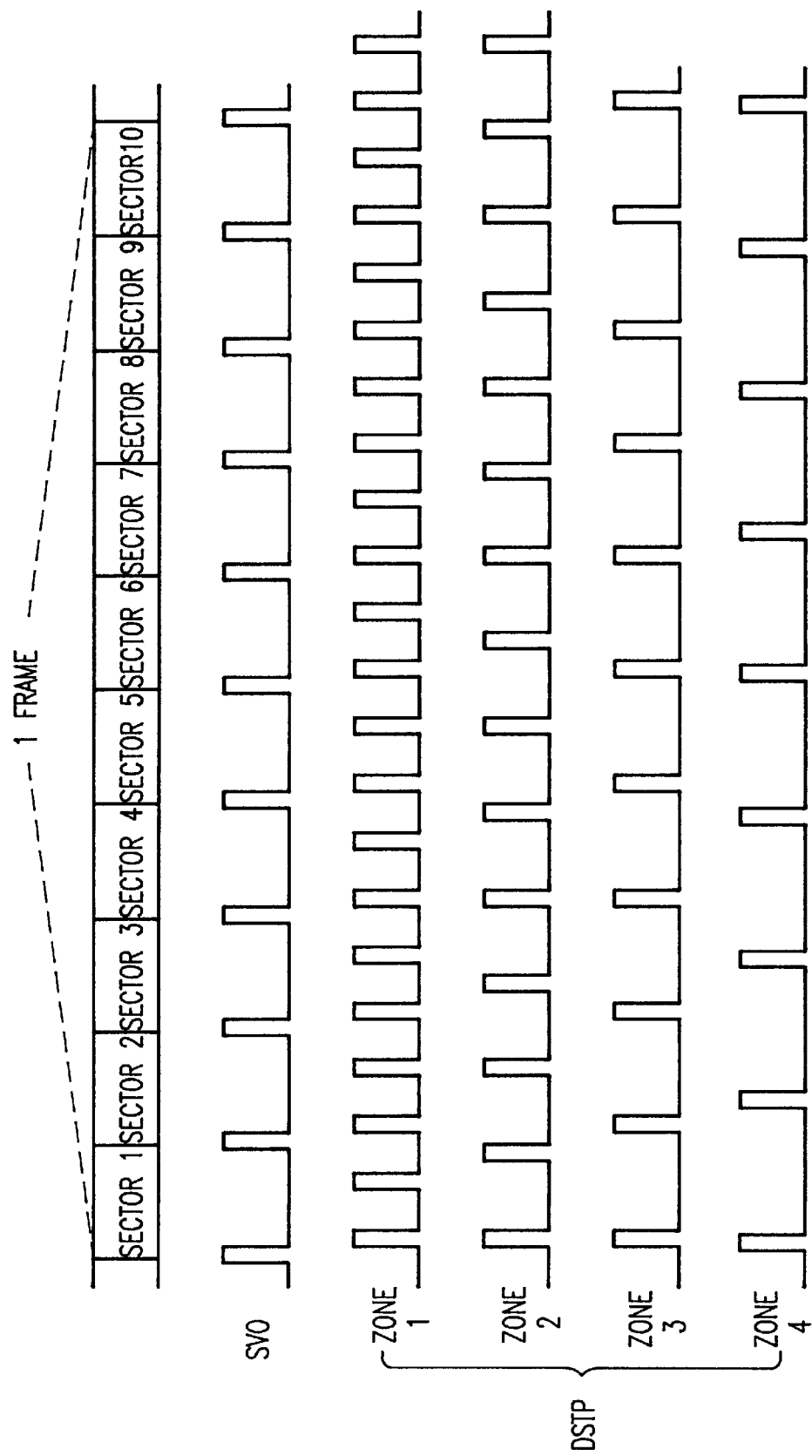
FIG. 3 is a diagram illustrating a signal timing to classify the servo sector and the data sector in a single frame.

Referring to the attached drawings, the best modes of the present invention will now be described in detail. It is noted that in the drawings, the same components of structural elements are indicated with the same reference numeral. Also, the description of publicly known function and structure irrelevant to the gist of present invention will be omitted.

Figure 5:
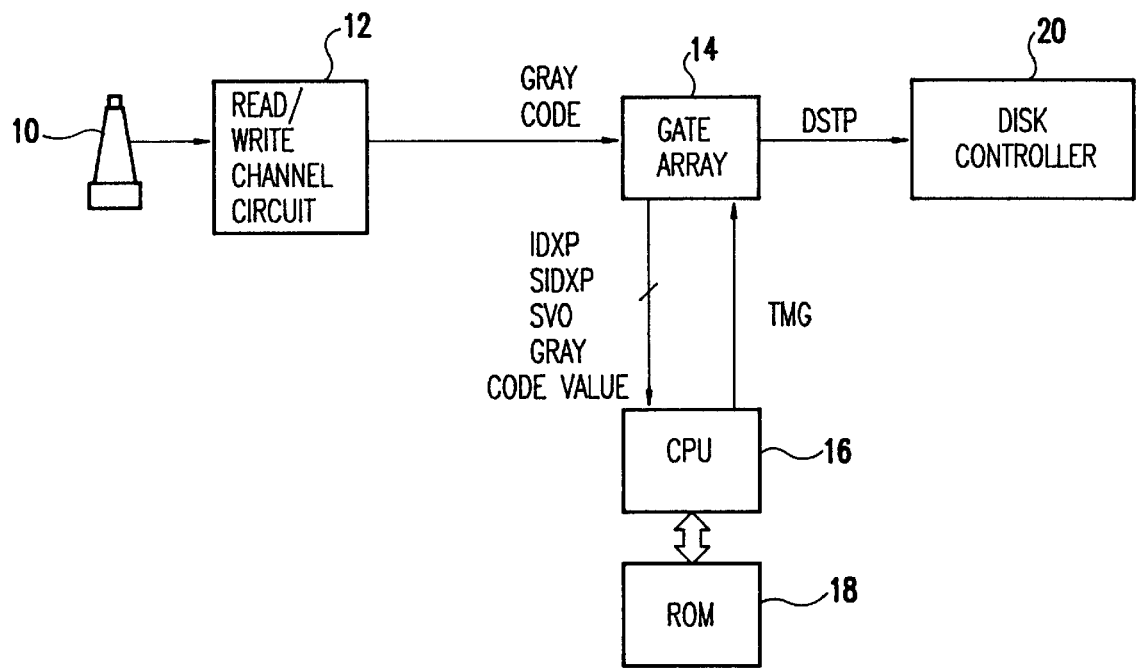
FIG. 5 is a block diagram illustrating how the data sector pulse may be generated in the conventional technology.
Figure 6:
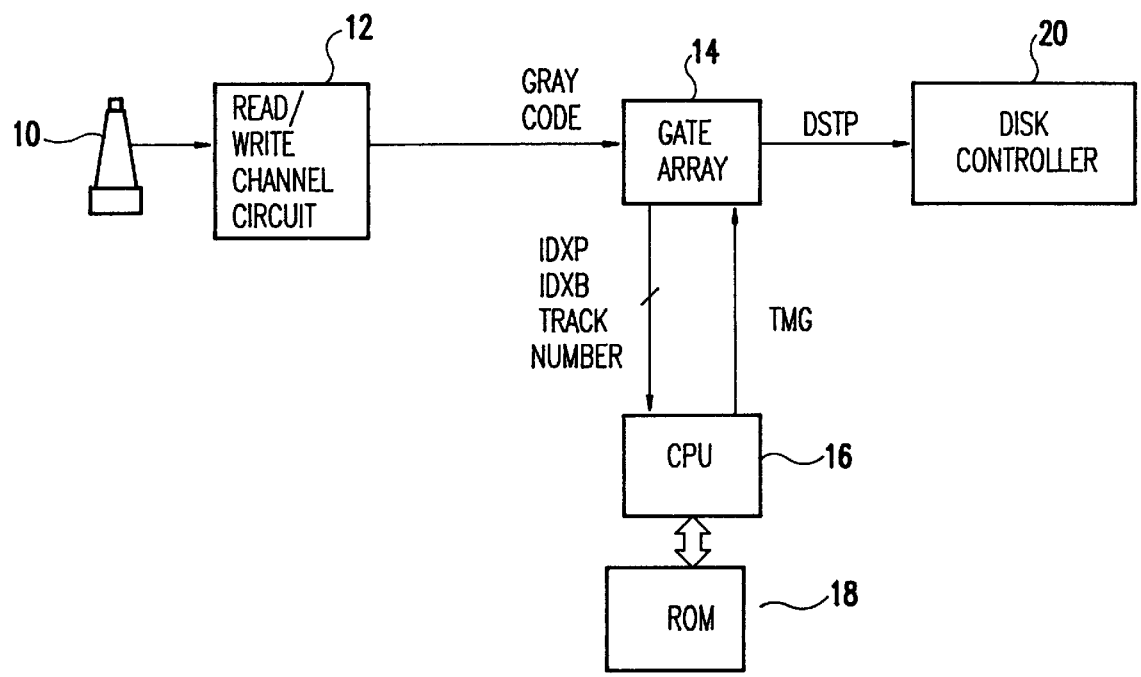
FIG. 6 is a block diagram illustrating the generation of a data sector pulse according to the preferred embodiment of the present invention.

FIG. 6 is a block diagram illustrating generation of a data sector pulse according to the preferred embodiment of the present invention. The block diagram of FIG. 6 is similar to that of FIG. 5. However, signals between gate array 14 and CPU 16 are different from those in conventional technology. Also, the contents mapped in ROM 18 is different from those in the prior art.

In ROM 18 according to the present invention, zone information on a previous track is mapped, and also, a data sector table for generating a data sector pulse timing value of each zone is mapped therein. The data sector table contains a data sector pulse timing value for a representative frame of each zone based on a change of frame number of the zone according to the characteristic of each zone of a disk.

In accordance with a preferred embodiment of the present invention, a one bit index pattern information corresponding to each servo sector is recorded in an index area within a servo area on a magnetic disk. The index pattern information existing in one track may be determined by a predetermined rule.

Referring to FIG. 6, index pattern information (IDXPTN) read by head 10 may be decoded into an index bit (IDXB) at gate array 14. At the same time, gate array 14 may decode a gray code which indicates a track position from the servo signal (which will be a track number) and applies the decoded signal to CPU 16. CPU 16 seeks the position of the corresponding track according to the track number, and also, reads IDXB to check an index pattern and calculates the number of the servo sector. A data sector pulse timing value (TMG) which should occur in the servo sector is read a timing table for generation of the data sector pulse mapped in ROM 18. TMG may be loaded on gate array 14 thereafter. Then, gate array 14 may generate a corresponding data sector pulse DSTP. A disk controller 20 stores or transmits information in or to a particular data sector by using DSTP.

In the index pattern in the servo area of the magnetic disk according to the preferred embodiment of the present invention, one IDXB is written. As a preferred embodiment of the present invention, provided that a single arbitrary track is structured with 80 servo sectors, the IDXB is written on the track as shown in the following index bit table illustrated in Table 2.

TABLE 2

| SECTOR NUMBER | INDEX BIT | SECTOR NUMBER | INDEX BIT | SECTOR NUMBER | INDEX BIT | SECTOR NUMBER | INDEX BIT |
|---|---|---|---|---|---|---|---|
| 1 | 1 | 21 | 0 | 41 | 1 | 61 | 1 |
| 2 | 1 | 22 | 0 | 42 | 1 | 62 | 0 |
| 3 | 1 | 23 | 1 | 43 | 1 | 63 | 0 |
| 4 | 0 | 24 | 1 | 44 | 0 | 64 | 0 |
| 5 | 0 | 25 | 1 | 45 | 0 | 65 | 1 |
| 6 | 0 | 26 | 1 | 46 | 1 | 66 | 1 |
| 7 | 0 | 27 | 1 | 47 | 1 | 67 | 1 |
| 8 | 1 | 26 | 0 | 46 | 0 | 68 | 0 |
| 9 | 1 | 29 | 0 | 49 | 1 | 69 | 1 |
| 10 | 1 | 30 | 1 | 50 | 1 | 70 | 0 |
| 11 | 1 | 31 | 0 | 51 | 1 | 71 | 0 |
| 12 | 0 | 32 | 0 | 52 | 0 | 72 | 1 |
| 13 | 0 | 33 | 1 | 53 | 0 | 73 | 1 |
| 14 | 0 | 34 | 1 | 54 | 1 | 74 | 1 |
| 15 | 1 | 35 | 1 | 55 | 1 | 75 | 1 |
| 16 | 0 | 36 | 0 | 56 | 1 | 76 | 0 |
| 17 | 1 | 37 | 0 | 57 | 1 | 77 | 1 |
| 16 | 1 | 36 | 1 | 58 | 1 | 76 | 1 |
| 19 | 1 | 39 | 0 | 59 | 1 | 79 | 0 |
| 20 | 0 | 40 | 1 | 60 | 0 | 80 | 0 |

In Table 2, every 8 sectors are gathered from the first frame, and index bits of the gathered sectors are defined as a group. For example, index bits of sectors 1–8, sectors 9–16, sectors 17–24, . . . and sectors 72–80 are defined as group 1, group 2, group 3, . . . and group 10, respectively. Index bits of the first four sectors in each group are defined as a "key pattern." Index bits of the remaining four sectors following the key pattern in each group is defined as a "group value." The definition stated above is summarized as the following Table 3.

TABLE 3

| Group | Index Bit Key Pattern | Index Bit Group Value (decimal number) |
|---|---|---|
| Group 1 | 1110 | 0001 (1) |
| Group 2 | 1110 | 0010 (2) |
| Group 3 | 1110 | 0011 (3) |
| Group 4 | 1110 | 0100 (4) |
| Group 5 | 1110 | 0101 (5) |
| Group 6 | 1110 | 0110 (6) |
| Group 7 | 1110 | 0111 (7) |
| Group 8 | 1110 | 1000 (8) |
| Group 9 | 1110 | 1001 (9) |
| Group 10 | 1110 | 1010 (10) |

Referring to Table 3, the key pattern is identically "1 1 1 0" in any group. The group value of group 1 is "1"; that of group 2 is "12"; that of group 3 is "31"; . . . ; and that of group 10 is "10." That is, it is noted that the group values of the adjacent group values are sequential.

Figure 7:
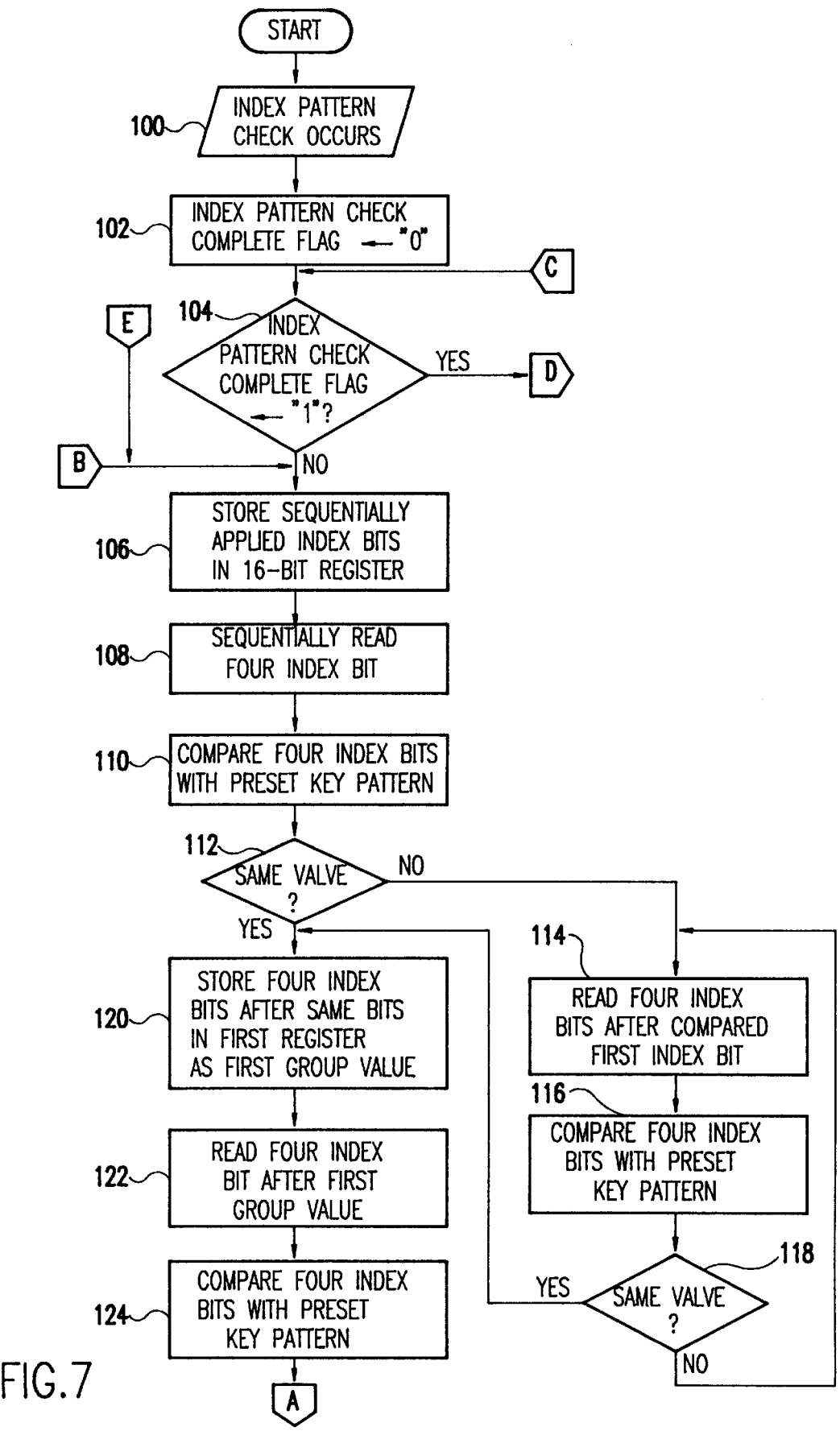
FIG. 7 is a flow chart for explaining control of the data sector pulse generation according to a preferred embodiment of the present invention.
Figure 7A:
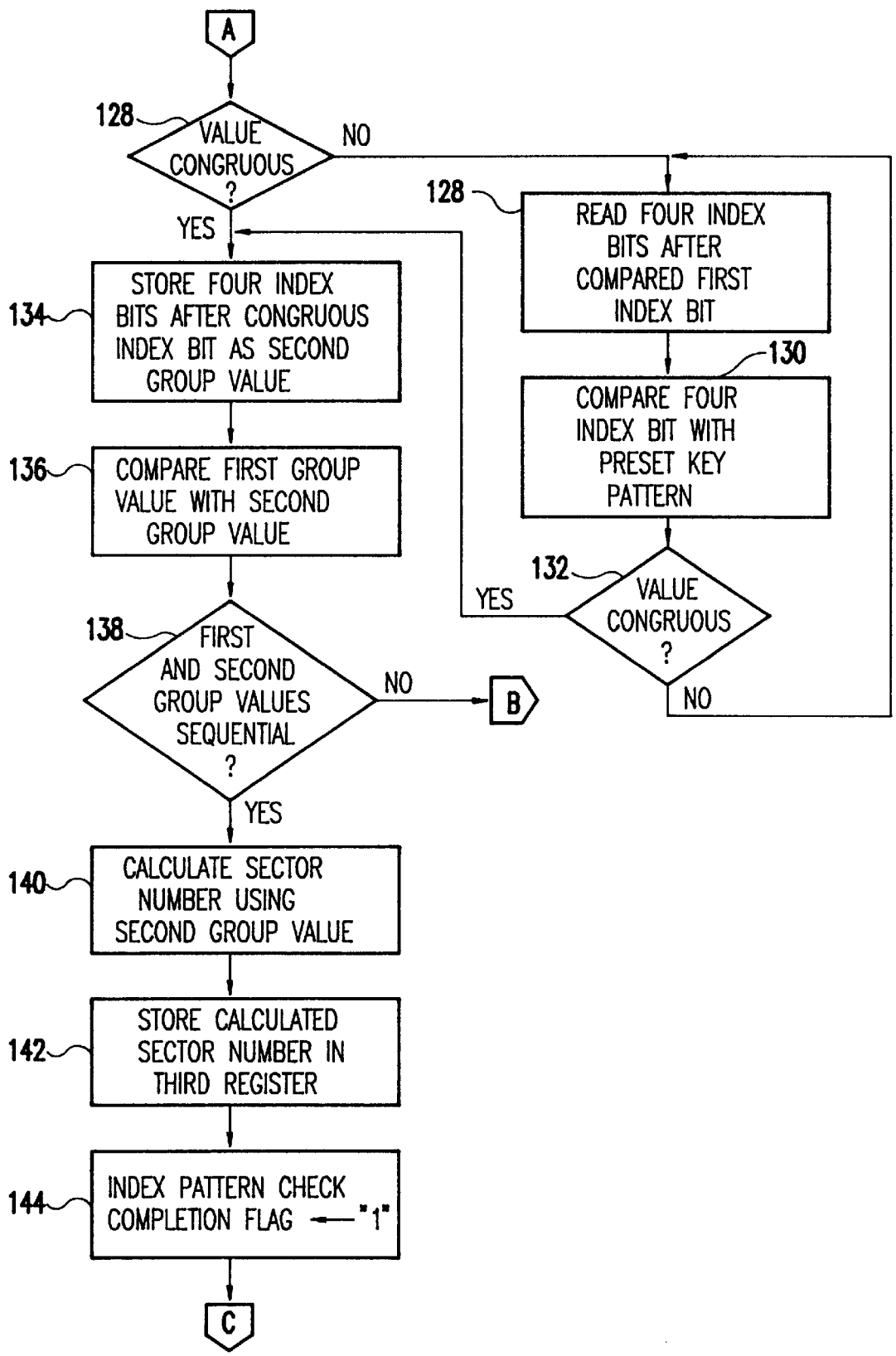
Figure 7B:
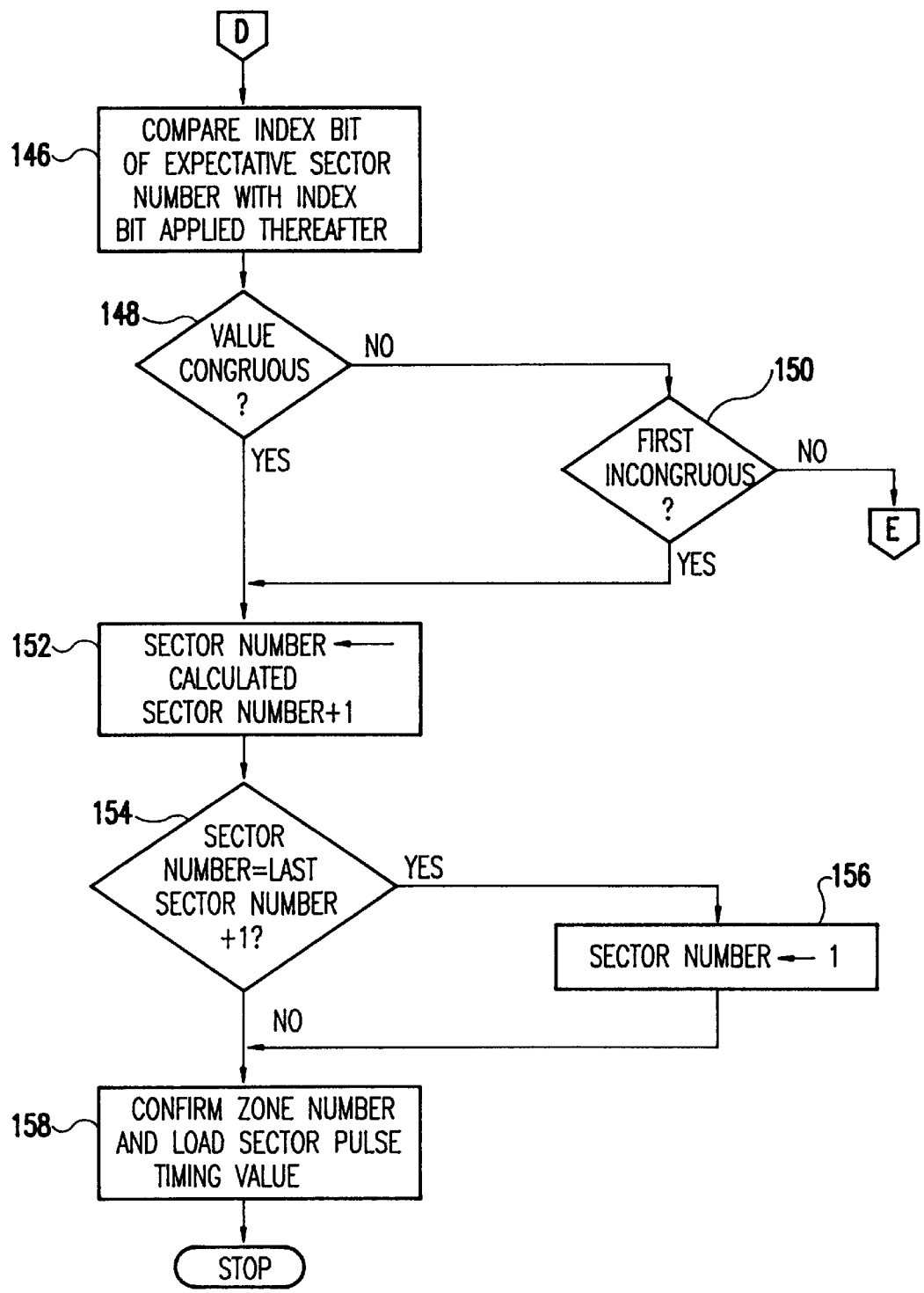

FIG. 7 is a flow chart for explaining control of the data sector pulse generation according to a preferred embodiment of the present invention. The control operation according to FIG. 7 is performed by the CPU 16 of FIG. 6.

Referring to FIGS. 6 and 7, when an index pattern check situation happens as shown in step 100 of FIG. 7, CPU 16 of FIG. 6 resets an index pattern check completion flag, in step 102. That is, the flag is set to "0." The index pattern check situation may occur when initial setting is made. Alternately, an index pattern check situation may occur when a current sector number may missing due to head failure. In addition, index pattern check situation may occur when an index pattern check is tested.

In step 104, CPU 16 determines whether the index pattern check completion flag is "1." If the pattern check situation happens, the flag is set to "0," and CPU 16 performs step 106. Whenever decoding the IDXB corresponding to each servo sector on the magnetic disk, gate array 14 outputs the IDXB to CPU 16. CPU 16 sequentially stores the IDXBs output from gate array 14 in step 106 in registers.

The above-mentioned example of the index bit Table 2 is referred in order to help understanding of the below description. Supposing that the head reads the IDXB from sector 1 (sector no. 1) of the index bit Table 2 (the first assumption), the index bit values of "1 1 1 0 0 0 0 1 1 1 1 0 0 0 1 0" are stored in a 16-bit register.

CPU 16 performs step 106 and proceeds to step 108. In step 108, CPU 16 primarily reads four index bits in an order of storing turn in the 16-bit register. According to the first assumption, four index bits are "1 1 1 0." Then, in step 110, the four index bits are compared with a preset key pattern. CPU 16 sets the key pattern to "1 1 1 0." Then, in step 112, the compared values are determined by CPU 16. The compared result thereof is congruous according to the above assumption. When the compared values are congruous, CPU 16 proceeds to step 114.

If the compared values are not congruous, CPU 16 keeps comparing by changing the four index bits which are a comparison objective until the changed index bits are congruous with the preset key pattern, which are performed through steps 114–118. If the head reads the IDXB from sector 2 (sector no. 2) of the index bit Table 2 (the second assumption), index bit values of "1 1 0 0 0 0 1 1 1 1 0 0 0 1 0 1" are stored in the 16-bit register. In such second assumption, since the four index bits which are first comparison objective are "1 1 0 0, " it is noted that the index bits are not congruous with the key pattern (1 1 1 0). Since the 16-bit register is a FIFO (first in first out) structure, when the index bit is input in a full state, the index bit stored oldest is discarded.

When the four index bits compared in step 112 do not accord with the key pattern, CPU 16 discards the compared first index bit "1" and reads the four remaining index bits, that is, "1 0 0 0." Then, CPU 16 compares the four index bits (1 0 0 0) read from step 116 with the preset key pattern (1 1 1 0), and determines whether the compared result is congruous with the compared value in step 118. When it is determined to be congruous, the step flows to step 120.

In the case of the second assumption, since the four index bits (1 0 0 0) is not congruous with the key pattern (1 1 1 0), step 114 is performed again. By repeating steps 114–118, the four index bits which is the objective of comparison becomes "0 0 0 0" "0 0 0 1" "0 0 1 1" "0 1 1 1" "1 1 1 1" "1 1 1 0." When the four index bits become "1 1 1 0," CPU 16 goes to step 120 since it becomes congruous with the key pattern (1 1 1 0).

In step 120, CPU 16 stores the four index bits after the index bit which is congruous with the key pattern in a first register as a first group value. In the case of the first assumption, "0 0 01" becomes the first group value, and in the case of the second assumption, "0 0 1 0" becomes the first group value.

The, CPU 16 goes to the step 122 and reads the sequential four index bits after the first group value. The four index bits are "1 1 1 0" in each case of the first and second assumptions. The operation of steps 124–132 thereafter are similar to that of the above-described steps 110–118. To sum up the processes from step 124 to step 132, it is determined whether the sequential four index bits after the first group value is congruous with the key pattern, and when congruous, step 134 operates. If not congruous in step 132, the comparison continues by changing the four index bits until the same becomes congruous with the preset key pattern. When congruous, the flow goes to step 134.

CPU 16 stores the four index bits after the index bits which are congruous with the key pattern in step 134 in a second register as a second group value. In the case of the first assumption, "0 0 1 0" becomes the second group value, and in the case of second assumption, "0 0 1 1" becomes the second group value. Then, CPU 16 which proceeds to step 136 reads the first group value from the first register, and compares the above read value with the second group value read from the second register. In step 138, it is determined whether the first and second group value are sequential. If it is determined not to be sequential, CPU 16 returns the step 106 of FIG. 7.

In the above-mentioned first assumption, the first group value is "0 0 0 1" and the second group value is "0 0 1 0." Thus, the first and second group values are said to be sequential in the first assumption. In the above second assumption, the first group value is "0 0 1 0" and the second group value is "0 0 1 1." Also, it can be said that the first and second group values are sequential. When the first and second group values are sequential, CPU proceeds to step 140. In step 140, CPU 16 calculates a sector number using the second group value. The sector number is calculated according to the Equation 1.

Sector number=Second group value×8    (Equation 1)

Since the second group value is "0 0 1 0" (2 in decimal digit) in the first assumption, the calculated sector number is "16." Also, since the second group value is "0 0 1 1" (3 in decimal digit) in the second assumption, the calculated sector number is "24."

CPU 16 stores the sector number calculated in step 140 in a third register in step 142. In step 144, the index pattern check completion flag is set to "1." Then, CPU 16 returns the above-mentioned step 104. Throughout steps 100–144, CPU 16 completes the index pattern check.

In step 104, CPU 16 determines whether the index pattern check completion flag is set to "1." When the index pattern check completion flag is set to "1" in step 104, CPU 16 performs from step 104 to step 146.

To sum up the process from step 146 to step 158, the position of each servo sector is accurately confirmed by counting the sector number in one track. According to the first and second assumptions, since the index pattern check completion flag of step 144 is set to "1," CPU 16 proceeds to step 146.

In step 146, CPU 16 compares the IDXB applied after the index pattern check completion with the first index bit of an expectative sector number. the expectative sector number is one that is resulted from adding 1 to the calculated sector number by the Equation 1. The index pattern bit of the expectative sector number is always "1" which is the first index pattern bit of the key pattern (1 1 1 0).

Referring to the index bit Table 2, since the sector number proceeds to "16" in the first assumption when the index pattern check is completed, the IDXB applied thereafter is "1" (index bit of sector number 17). Also, since the sector number proceeds to "24" in the second assumption when the index pattern check is completed, the IDXB applied thereafter is "1" (index bit of sector number 25).

After step 146, CPU 16 goes to step 148 and determines whether the applied IDXB is congruous with the index bit of the expectative sector number. If congruous, CPU 16 proceeds to step 152 and if not, proceeds to step 150. In step 150, CPU determines whether the incongruity occurs first, and if it is determined to be the first one, the operation goes to step 152. If it is not the first one, the operation returns to step 106 and proceeds therefrom, that is, the index pattern check is performed again.

In step 152, CPU 16 makes a current sector number by adding 1 to the calculated sector number. Since the sector number calculated in the first assumption is "16," the current sector number becomes "17." Also, since the sector number calculated in the second assumption is "24," this current sector number becomes "25." In step 154, CPU 16 determines whether the current sector number is one that is made by adding 1 to the last sector number. The last sector number of the index bit Table 2 is "80." In step 154, the sector number becomes "1" when the current sector number is one that is made by adding 1 to the last sector number. Then, step 156 is performed. Such operation is performed since the last sector number and the first sector number are adjacent. When it is determined whether the current sector number is not the one to which 1 is added in step 154, step 158 is performed.

In step 158, CPU 16 confirms a zone number and loads a data sector timing value. In the ROM 18, zone information of the whole tracks is mapped, and also, a data sector table for generating the data sector pulse timing value of each zone is mapped therein. In step 158, it is confirmed from the ROM 18 that which zone the current track belongs by a servo header output from gate array 14. Then, the data sector pulse timing value TMG in accordance with each zone is read out from ROM 18. The method for reading the TMG is possible by using the following Equation 2, wherein the timing value with respect to the last servo sector is read when the remainder is zero.

$$\text{Data Sector Pulse Timing Value} = \frac{\text{Timing Value w/Respect to Remaining Servo Sector}}{} \text{ of:}$$

EQUATION 2

-continued $$\left(\frac{\text{Servo Sector}}{\frac{\text{Servo Sector Number}}{\text{Frame}}}\right) \text{ of each zone}$$

In such way, when the TMG is read, CPU 16 loads the read result in gate array 14. CPU 16 performing step 158 in that way completes the whole process.

In step 158, when CPU 16 loads the TMG in gate array 14, gate array 14 applies the DSTP to the disk controller 20 in accordance with the TMG.

Figure 8:
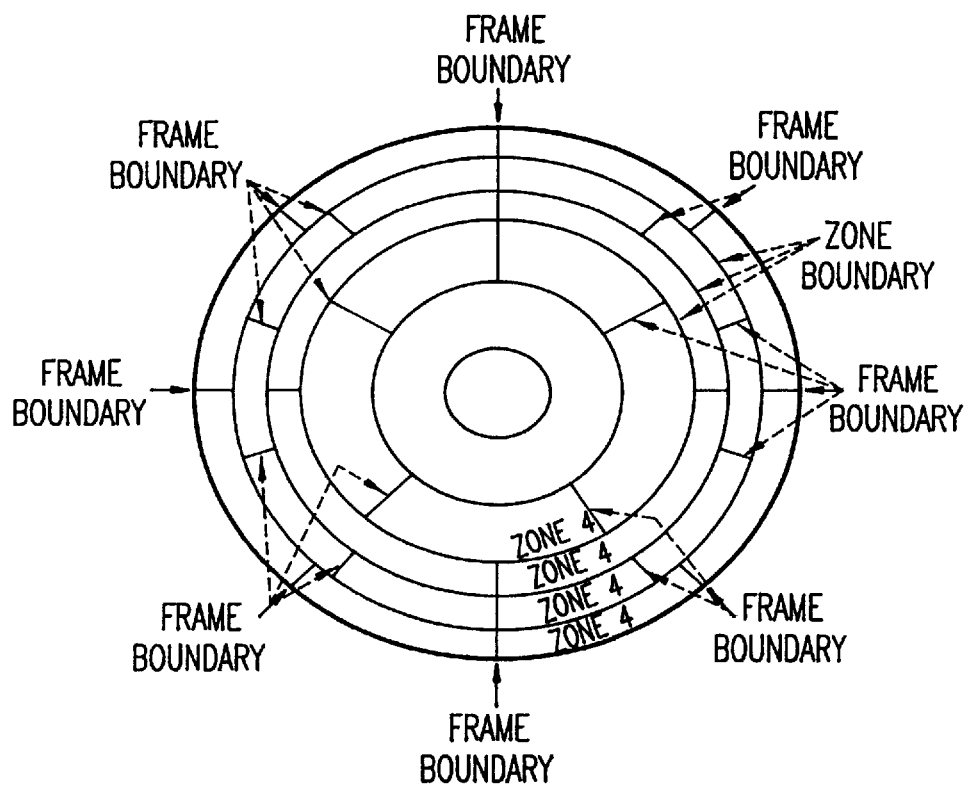
FIG. 8 is a diagram illustrating a frame structure of a magnetic disk according to a preferred embodiment of the present invention.

FIG. 8 is a diagram illustrating a frame structure of a magnetic disk according to a preferred embodiment of the present invention. Referring to FIG. 8, the structure of the frame is differentiated by a zone. Zone 1 is structured by 8 frames; zone 2 is 10 frames; zone 3 is 4 frames; and zone 4 is 5 frames. Since the index bit table is different in the length in accordance with each zone, the frame can be structured as shown in FIG. 8. The table length of each zone may be determined by the number of the servo sector having a repeatedly generated data sector pulse structure. The number of the servo sector differs according to the characteristic of each zone.

When one track has 80 servo sectors as shown in the above-described index bit Table 2, the number of the repeatedly generated data sector pulse by a zone shown in FIG. 8 is as follows. Zone 1 is 10 (since there are 8 frames in zone 1); zone 2 is 8 (since there are 10 frames in zone 2); zone 3 is 20 (since there are 4 frames in zone 3); and zone 4 is 16 (since there are 16 frames in zone 4).

Thus, the timing value mapped in the ROM 18 according to the preferred embodiment of the present invention is as follows.

zone 1=10 servo sectors
zone 2=8 servo sectors
zone 3=20 servo sectors
zone 4=16 servo sectors That is, the servo sector per each frame in each zone becomes the timing value.

In such an example, when the current sector number is 30 in zone 1, the timing value of the data sector pulse read from the data sector table by CPU 16 is as follows.

From Equation 2:

$$\text{Data Sector Pulse Timing Value} = \frac{\text{Timing Value w/Respect to Remaining Servo Sector}}{} \text{ of:} \quad \text{EQUATION 2}$$

$$\left(\frac{\text{Servo Sector}}{\frac{\text{Servo Sector Number}}{\text{Frame}}}\right) \text{ of each zone}$$

Wherein the timing value with respect to the last servo sector is read when the remainder is zero, Accordingly, as the remainder is zero, the data sector pulse timing value read by CPU 16 becomes the timing value of the last servo sector of zone 1, i.e., the timing value of the 10th servo sector:

$$\left(\frac{\text{Servo Sector}}{\frac{\text{Servo Sector Number}}{\text{Frame}}}\right) \text{ of each zone} = \left(\frac{30}{\frac{30}{10}}\right)$$

As described above, in the present invention, since the sector number is known, a frame structure by software is employed according to the table length of each zone not using a hardware frame structure. Thus, the number of the data sector can be easily set in accordance with the characteristic of each zone.

Also, in the present invention, since there is no concept of the servo index and the sector number is counted by the assembly of the index bits, it is a merit that the bit number of the index pattern present in the servo area can be reduced. Further, in the case that the index pattern information is read wrongly or reading the same fails, the compensation therefor renders easy relative to the conventional technology. By such compensation, reliability of the index pattern information is enhanced.

Therefore, it should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A method of generating a data sector pulse in a magnetic disk drive comprising the steps of:

servo-writing a bit of index pattern information corresponding to each servo sector in an index area of a servo area on said magnetic disk by a predetermined rule;

mapping a data sector pulse timing value with respect to a representative frame of each zone in an inside storage by changing the frame number of a relevant zone according to the characteristic of each zone; and reading as sector pulse timing value with respect to a predetermined sector of a predetermined track from said inside storage by deciphering said index pattern information read from said track according to said rule and loading the read result in a gate array for generating said data sector pulse:

wherein said index bit information is structured such that plural pieces of index bit information make one group and a plurality of said groups are present on one track, and wherein each said group comprises a key pattern which identifies the plural pieces of index information as a group and a group value which designates a group number of a corresponding group.

2. A method of generating a data sector pulse in a magnetic disk drive as claimed in claim 1, wherein said group value of adjacent servo sectors are sequential.

3. A method of generating a data sector pulse in a magnetic disk drive as claimed in claim 1, wherein 8 pieces of index information make up each group.

4. A method of generating a data sector pulse in a magnetic disk drive as claimed in claim 3, wherein said key pattern comprises 4 pieces of index bit information.

5. A method of generating a data sector pulse in a magnetic disk drive as claimed in claim 3, wherein said group value comprises 4 pieces of index bit information.

6. A method of generating data sector pulse in a magnetic disk drive where a data sector pulse timing value with respect to a representative frame of each zone is mapped in an inside storage by changing the frame number of relevant zone according to the characteristic of each zone, and a magnetic disk where a bit of index pattern information corresponding to each servo sector is recorded in an index area of a servo area by a predetermined rule during servo-writing, said generating method comprising the steps of:

storing index pattern information of a predetermined number following a first index pattern information as a first group value when said first index pattern information of a predetermined sequential number is congruous with a preset key pattern by inputting of a plurality of pieces of said index pattern information read from a predetermined track;

storing index pattern information of a predetermined number following a second index pattern information as a second group value when said second index pattern information of a predetermined number following said first group value is congruous with said key pattern after said first storing step;

calculating a sector number by using said second group value when said first and second group values are in sequence;

determining a current sector number by using the sector number calculated in said calculating step when applied index pattern information is congruous with expectative index pattern information after said calculating step; and confirming a zone number of a current track by using servo information of a servo area and loading the data sector pulse timing value corresponding to the current sector number of said confirmed zone according to said current sector number in a gate array for generating said data sector pulse.

7. A method of generating data sector pulse in a magnetic disk drive as claimed in claim 6, wherein said key pattern, said first group value and said second group value are comprised of 4 pieces of index pattern information.

8. A method of generating data sector pulse in a magnetic disk drive as claimed in claim 6, wherein said data sector pulse timing value is obtained by the following expression:

$$\text{Data Sector Pulse Timing Value} = \frac{\text{Timing Value w/Respect to Remaining Servo Sector}}{\left(\frac{\text{Servo Sector Number}}{\text{Frame}}\right) \text{ of each zone}}$$

wherein the timing value with respect to the last servo sector is read when the remainder is zero.

* * * * *